US012693768B1

(12) United States Patent
Lee et al.

(10) Patent No.: US 12,693,768 B1
(45) Date of Patent: Jul. 28, 2026

(54) PREDICTIVE TOUCH SYSTEM FOR A DISPLAY

(71) Applicant: GM Global Technology Operations LLC, Detroit, MI (US)

(72) Inventors: Toure Lee, Pontiac, MI (US); Reda Hassan, Dearborn Heights, MI (US); Syed Mohammad Tauqeer Akhtar, West Bloomfield, MI (US); Sonny H Quan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/086,525

(22) Filed: Mar. 21, 2025

(51) Int. Cl.
| | |
|---|---|
| *G06F 3/044* | (2006.01) |
| *B60K 35/22* | (2024.01) |
| *B60K 35/65* | (2024.01) |
| *G06F 3/041* | (2006.01) |
| *G06F 3/04886* | (2022.01) |

(52) U.S. Cl.
CPC ............ *G06F 3/0446* (2019.05); *B60K 35/22* (2024.01); *B60K 35/654* (2024.01); *B60K 35/656* (2024.01); *G06F 3/0416* (2013.01); *G06F 3/0443* (2019.05); *G06F 3/04886* (2013.01); *B60K 2360/1438* (2024.01); *B60K 2360/1526* (2024.01)

(58) Field of Classification Search
None
See application file for complete search history.

(56) References Cited

U.S. PATENT DOCUMENTS

| | | | |
|---|---|---|---|
| 2012/0068956 A1* | 3/2012 | Jira ........................ | B60K 35/10 |
| | | | 345/174 |
| 2016/0167517 A1* | 6/2016 | Nishihashi ............ | G06F 3/0488 |
| | | | 345/174 |
| 2018/0157329 A1* | 6/2018 | Salter ...................... | G06F 3/044 |
| 2020/0174596 A1 | 6/2020 | Cohen et al. | |
| 2021/0026470 A1* | 1/2021 | Perdices-Gonzalez ..................... | |
| | | | G06F 3/0416 |

FOREIGN PATENT DOCUMENTS

JP          2010191692 A          9/2010

* cited by examiner

*Primary Examiner* — Christopher R Lamb
(74) *Attorney, Agent, or Firm* — Vivacqua Crane, PLLC

(57) ABSTRACT

A predictive touch system for determining a source of a touch interaction between a dual touchscreen and either a leftward oriented user or a rightward oriented user includes one or more controllers in electronic communication with the dual touchscreen. The dual touchscreen includes a display and a capacitive grid array that is divided into a plurality of cells. In response to determining the source of the touch interaction, the one or more controllers instruct the dual touchscreen to generate unique graphic content specifically directed to either the leftward oriented user or the rightward oriented user upon the display.

20 Claims, 5 Drawing Sheets

PREDICTIVE TOUCH SYSTEM FOR A DISPLAY

INTRODUCTION

The present disclosure relates to a predictive touch system for a dual touchscreen that determines the source of a touch interaction.

A touchscreen allows individuals to interact and enter input into a display using either their fingers or a stylus. Touchscreens may be used in a variety of applications such as, for example, smartphones, video games, kiosk machines found in places such as public transportation, and vehicles. Indeed, many vehicles have infotainment systems that include a touchscreen interface that allows for a driver and a passenger to access content such as, but not limited to, music players and radio functions, hands-free calling, climate control, navigation, and traffic updates.

A dual touchscreen refers to a touchscreen that presents unique content specifically directed to either the driver or the passenger of a vehicle. The unique content is generated based on touch interaction between the display of the touchscreen and either the driver or the passenger of the vehicle. However, current dual touchscreens are unable to distinguish between the driver or passenger's touch interaction and the display of the touchscreen. Instead, current touchscreens may rely upon external sensors such as an in-cabin camera to determine if the source of a touch interaction originated from the driver or passenger of the vehicle.

Thus, while current touchscreens achieve their intended purpose, there is a need in the art for an improved approach for determining if the source of a touch interaction originates from the driver or the passenger of the vehicle.

SUMMARY

According to several aspects, a predictive touch system for determining a source of a touch interaction between a dual touchscreen and either a leftward oriented user or a rightward oriented user is disclosed. The predictive touch system includes one or more controllers in electronic communication with the dual touchscreen, where the dual touchscreen includes a display and a capacitive grid array that is divided into a plurality of cells. The one or more controllers include one or more processors that execute instructions to monitor the capacitive grid array for a first change in capacitance levels of the capacitive grid array and in response to detecting a first change in capacitance levels of the capacitive grid array, initiate calculating a touch intent vector that represents an origin point, a slope, and a direction travel of a finger of either the leftward oriented user or the rightward oriented user. The one or more controllers continue updating the slope and the direction of travel of the finger of the touch intent vector until detecting a second change in capacitance levels of the capacitive grid array, and in response to detecting the second change in capacitance levels of the capacitive grid array, cease updating the slope and direction of travel of the finger of the touch intent vector and determine the source of the touch interaction between the display of the dual touchscreen based on the origin point of the touch intent vector, the slope of the touch intent vector, and the direction of travel of the finger. In response to determining the source of the touch interaction, the one or more controllers instruct the dual touchscreen to generate unique graphic content specifically directed to either the leftward oriented user or the rightward oriented user upon the display.

In another aspect, calculating the touch intent vector is determined by: in response to detecting the first change in capacitance levels of the capacitive grid array, dividing the capacitance levels of the capacitive grid array into two or more capacitance gradient levels, and identifying an individual cell of the capacitive grid array having the maximum capacitance level of the two or more capacitance gradient levels.

In still another aspect, calculating the touch intent vector is determined by: determining unique two-dimensional Cartesian coordinates assigned to the individual cell of the capacitive grid array having a maximum capacitance level of the two or more capacitance gradient levels.

In an aspect, the unique two-dimensional Cartesian coordinates assigned to the individual cell of the capacitive grid array represents the origin point of the touch intent vector.

In another aspect, calculating the touch intent vector is determined by: calculating intermediate values for the slope and the direction of travel of the finger of the touch intent vector for all time values up until a current point in time.

In still another aspect, calculating the touch intent vector is determined by: in response to detecting the second change in capacitance levels of the capacitive grid array, determine the finger is contacting an outer surface of the display and determine the slope and the direction of travel of the finger of the touch intent vector.

In an aspect, the first change in capacitance indicates a hover interaction between the finger of either the leftward oriented user or the rightward oriented user and an outer surface of a front lens of the display of the dual touchscreen.

In another aspect, the second change in capacitance is indicative of the finger of either the leftward oriented user or the rightward oriented user contacting an outer surface of the display.

In still another aspect, the leftward oriented user is a driver of a vehicle and the rightward oriented user is a front passenger of the vehicle.

In an aspect, the one or more controllers instruct one or more systems that are part of the vehicle to disregard input to the dual touchscreen generated by the source of the touch interaction.

In another aspect, a decision tree including a flow diagram for determining the source of the touch interaction based on the origin point of the touch intent vector, the slope of the touch intent vector, and the direction of travel of the finger creating the touch intent vector is stored in memory of the one or more controllers.

In still another aspect, a root node of the decision tree assigns the origin point of the touch intent vector to one of a plurality of first level decision nodes based on a unique region where the origin point is located within the capacitive grid array of the dual touchscreen.

In an aspect, each cell of the capacitive grid array is assigned to one of the unique regions based on their relative position to one another.

In another aspect, a method for determining a source of a touch interaction between a dual touchscreen and either a leftward oriented user or a rightward oriented user by a predictive touch system. The method includes monitoring, by one or more controllers, a capacitive grid array of the dual touchscreen for a first change in capacitance levels of the capacitive grid array, where the one or more controllers are in electronic communication with the dual touchscreen, the dual touchscreen includes a display, and the capacitive grid array is divided into a plurality of cells. In response to detecting a first change in capacitance levels of the capacitive grid array, the method includes initiate calculating a touch intent vector that represents an origin point, a slope, and a direction travel of a finger of either the leftward oriented user or the rightward oriented user. The method includes continuing updating the slope and the direction of travel of the finger of the touch intent vector until detecting a second change in capacitance levels of the capacitive grid array. In response to detecting the second change in capacitance levels of the capacitive grid array, the method includes cease updating the slope and direction of travel of the finger of the touch intent vector and determine the source of the touch interaction between the display of the dual touchscreen based on the origin point of the touch intent vector, the slope of the touch intent vector, and the direction of travel of the finger. In response to determining the source of the touch interaction, the method includes instructing the dual touchscreen to generate unique graphic content specifically directed to either the leftward oriented user or the rightward oriented user upon the display.

In another aspect, a predictive touch system for determining a source of a touch interaction between a dual touchscreen and either a driver or a passenger of a vehicle is disclosed. The predictive touch system includes one or more controllers in electronic communication with the dual touchscreen, where the dual touchscreen includes a display and a capacitive grid array that is divided into a plurality of cells. The one or more controllers include one or more processors that execute instructions to monitor the capacitive grid array for a first change in capacitance levels of the capacitive grid array. In response to detecting a first change in capacitance levels of the capacitive grid array, the one or more controllers initiate calculating a touch intent vector that represents an origin point, a slope, and a direction travel of a finger of either the driver of the passenger of the vehicle. The one or more controllers continue updating the slope and the direction of travel of the finger of the touch intent vector until detecting a second change in capacitance levels of the capacitive grid array. In response to detecting the second change in capacitance levels of the capacitive grid array, the one or more controllers cease updating the slope and direction of travel of the finger of the touch intent vector and determine the source of the touch interaction between the display of the dual touchscreen based on the origin point of the touch intent vector, the slope of the touch intent vector, and the direction of travel of the finger. In response to determining the source of the touch interaction, the one or more controllers instruct the dual touchscreen to generate unique graphic content specifically directed to either the driver or the passenger upon the display and instruct one or more systems that are part of the vehicle to disregard input to the dual touchscreen generated by the source of the touch interaction.

In another aspect, calculating the touch intent vector is determined by: in response to detecting the first change in capacitance levels of the capacitive grid array, dividing the capacitance levels of the capacitive grid array into two or more capacitance gradient levels, and identifying an individual cell of the capacitive grid array having the maximum capacitance level of the two or more capacitance gradient levels.

In still another aspect, calculating the touch intent vector is determined by: determining unique two-dimensional Cartesian coordinates assigned to the individual cell of the capacitive grid array having a maximum capacitance level of the two or more capacitance gradient levels.

In an aspect, the unique two-dimensional Cartesian coordinates assigned to the individual cell of the capacitive grid array represents the origin point of the touch intent vector.

In another aspect, calculating the touch intent vector is determined by: calculating intermediate values for the slope and the direction of travel of the finger of the touch intent vector for all time values up until a current point in time.

In still another aspect, calculating the touch intent vector is determined by: in response to detecting the second change in capacitance levels of the capacitive grid array, determine the finger is contacting an outer surface of the display and determine the slope and the direction of travel of the finger of the touch intent vector.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
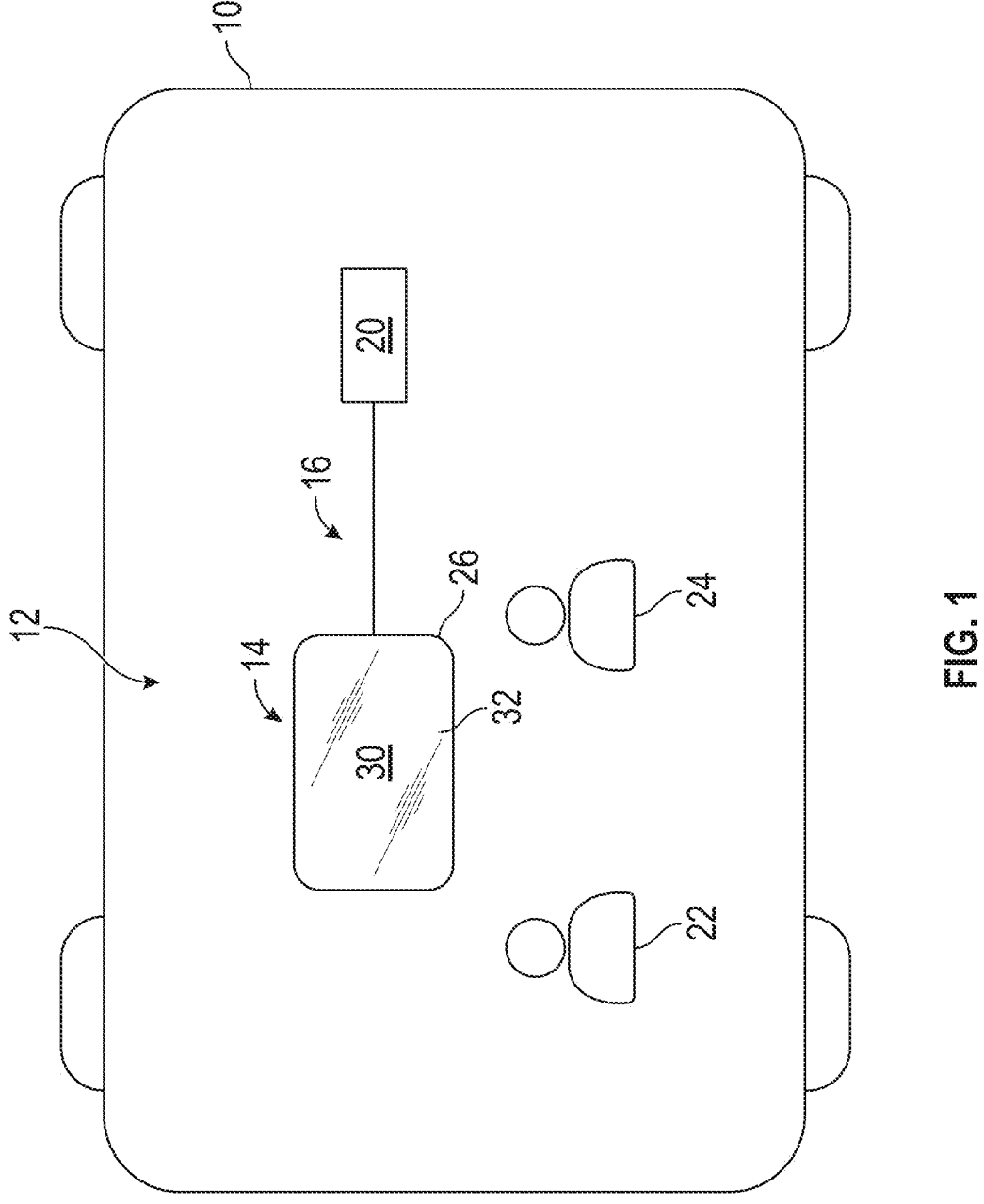
FIG. 1 illustrates a schematic diagram of an infotainment system for a vehicle including the disclosed predictive touch system that includes a dual touchscreen in electronic communication with one or more controllers, according to an exemplary embodiment.

Referring to FIG. 1, schematic diagram of a vehicle 10 including an infotainment system 12 is illustrated. It is to be appreciated that the vehicle 10 may be any type of vehicle such as, but not limited to, a sedan, a truck, sport utility vehicle, van, or motor home. The infotainment system 12 includes a dual touchscreen 14 and a predictive touch system 16 for the dual touchscreen 14. The predictive touch system 16 includes one or more controllers 20 in electronic communication with the dual touchscreen 14. The dual touchscreen 14 includes a display 26 having a front lens 32 that defines an outer surface 30. The dual touchscreen 14 shows unique graphic content specifically directed to either a leftward oriented user 22 or a rightward oriented user 24 upon the display 26. The unique graphic content is generated based on a touch interaction between the display 26 of the touchscreen and the fingers of either the leftward oriented user 22 or the rightward oriented user 24 of the vehicle 10.

In embodiments, the unique graphic content may be specifically tailored to accommodate the viewing angles of either the leftward oriented user 22 or the rightward oriented user 24.

In the embodiment as shown in FIG. 1 where the dual touchscreen 14 is part of a vehicle, the leftward oriented user 22 is the driver of the vehicle 10 and the rightward oriented user 24 is a front passenger of the vehicle 10. However, it is to be appreciated that FIG. 1 is merely exemplary in nature and the predictive touch system 16 is not limited to a vehicle. Indeed, the predictive touch system 16 may be used in other dual touchscreen applications having a leftward oriented user and a rightward oriented user such as, but not limited to, a multiplayer video game or a multiuser kiosk machine found in places like public transportation, medical offices, and amusement parks.

Although the disclosure describes the touch interaction originating from the fingers of either the leftward oriented user 22 or the rightward oriented user 24 of the vehicle 10, it is to be appreciated that the touch interaction may also be created by a stylus (i.e., the finger may be substituted by a stylus). It is also to be appreciated that the touch interaction includes not only direct contact with the display 26 but also hover interaction as well. Hover interaction refers to when a finger is placed within close proximity but does not contact the outer surface 30 of the display 26 of the dual touchscreen 14. In one embodiment, a finger is within close proximity to the outer surface 30 of the display 26 when the distance between the outer surface 30 of the display 26 and the finger is equal to or less than about 35 millimeters.

As explained below, the predictive touch system 16 determines the source of the touch interaction between the display 26 of the dual touchscreen 14, where the source of the touch interaction is either the leftward oriented user 22 or the rightward oriented user 24 of the vehicle 10. In response to determining the source of the touch interaction, the one or more controllers 20 may instruct the dual touchscreen 14 to generate unique graphic content specifically directed to either the leftward oriented user 22 or the rightward oriented user 24 upon the display 26. One example of the unique graphic content includes a virtual control graphic that allows the respective user 22, 24 to adjust a feature directed towards a single occupant in the vehicle 10. Some examples of features directed towards a single occupant in the vehicle 10 include, but are not limited to, heated/ventilated seats, dual zone climate control, and media access. Specifically, in one embodiment, the virtual control graphic may only include one icon specifically directed to only the leftward oriented user 22 or the rightward oriented user 24, even if there are separate features within the vehicle 10 for both users 22, 24. For example, instead of showing separate icons for a passenger heated seat and a driver heated seat (or ventilated or massaging seats depending on the application), the icon corresponding to only the passenger heated seat is shown upon the display 26.

In one embodiment, in addition to generating the unique graphic content upon the dual touchscreen 14, in response to determining the source of the touch interaction the one or more controllers 20 of the predictive touch system 16 may also instruct one or more systems that are part of the vehicle 10 to disregard input to the dual touchscreen 14 generated by the source of the touch interaction. The one or more systems that are part of the vehicle 10 may include, for example, automatic door lock systems and display lock out. For example, if the rightward oriented user 24 is a child located in the front passenger seat of the vehicle 10, then the one or more controllers 20 may instruct the door lock system to disregard the touch interaction originating from the child. Display lock out refers to when a passenger's interaction with the display 26 is ignored so as to ensure media content selected by a driver, such as a movie or show, is kept on.

Figures 2, 3:
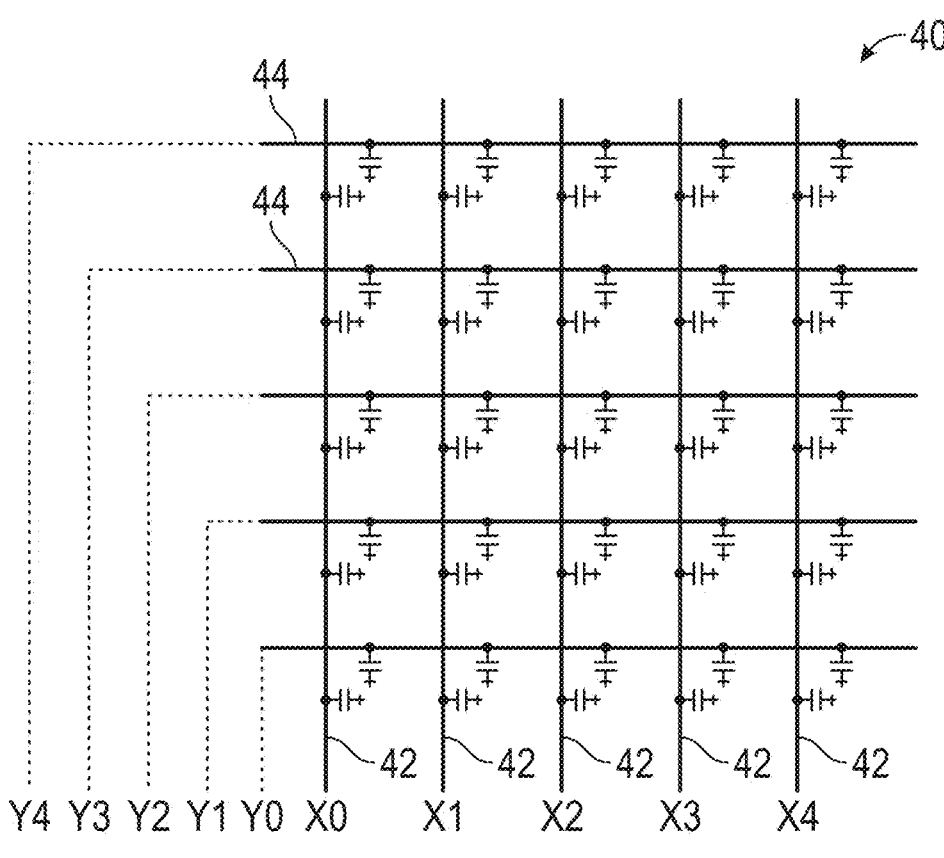
FIG. 2 is a schematic diagram of a capacitive grid array that is part of the dual touchscreen shown in FIG. 1, according to an exemplary embodiment.
FIG. 3 is a schematic diagram illustrating a portion of a node map of the capacitive grid array that includes a plurality of cells, according to an exemplary embodiment.

The display 26 of the touchscreen 14 may be any type of display for showing graphics and text such as, for example, light-emitting diode (LED) display, an organic LED (OLED) display, or a liquid crystal display (LCD). FIG. 2 illustrates a portion of a capacitive grid array 40 that is part of the dual touchscreen 14 shown in FIG. 1, where the capacitive grid array 40 is located underneath the front lens 32 of the display 26 of the dual touchscreen 14. The capacitive grid array 40 includes a plurality of vertically oriented capacitive traces 42 and a plurality of horizontally oriented capacitive traces 44 that intersect one another. Each vertically oriented capacitive trace 42 is identified based on an x-coordinate (e.g., X1, X2, X3, X4) and each horizontally oriented capacitive trace 44 is identified based on a y-coordinate (e.g., Y0, Y1, Y2, Y3, Y4).

Referring to both FIGS. 1 and 2, the vertically oriented capacitive traces 42 and the horizontally oriented capacitive traces 44 generate changes in capacitance levels in response to experiencing a touch interaction. That is, the vertically oriented capacitive traces 42 and the horizontally oriented capacitive traces 44 generate changes in capacitance levels in response to either a finger contacting the outer surface 30 of the front lens 32 of the display 26, or the hover interaction that is created when a finger is placed within close proximity of the outer surface 30 of the front lens 32 of the display 26. As explained in detail below, the predictive touch system 16 determines the source of a touch interaction based on the changes in capacitance levels created by the capacitive grid array 40, where the source of the touch interaction is either the leftward oriented user 22 or a rightward oriented user 24.

FIG. 3 is a schematic diagram illustrating a portion of a node map 50 of the capacitive grid array 40 shown in FIG. 2. The capacitive grid array 40 of the of the dual touchscreen 14 is divided into a plurality of cells 48 that are arranged in a grid pattern 52. Each cell 48 of the capacitive grid array 40 represents an intersection or node 54 between a vertically oriented capacitive trace 42 and a horizontally oriented capacitive trace 44 (FIG. 2) of the capacitive grid array 40. In the non-limiting embodiment as shown in FIG. 3, the plurality of cells 48 each include a rectangular profile, however, it is to be appreciated that FIG. 3 is merely exemplary in nature and the cells 48 may include other profiles as well. Each cell 48 is also assigned a unique two-dimensional Cartesian coordinates that are determined based on the node 54 created by the intersection between the vertically oriented capacitive trace 42 and the horizontally oriented capacitive trace 44. For example, the cell 48 assigned the two-dimensional Cartesian coordinates (0,0) represents an intersection between the vertically oriented capacitive trace 42 identified based on an x-coordinate of zero and a horizontally oriented capacitive trace 44 identified based on a y-coordinate of zero.

Figure 4:
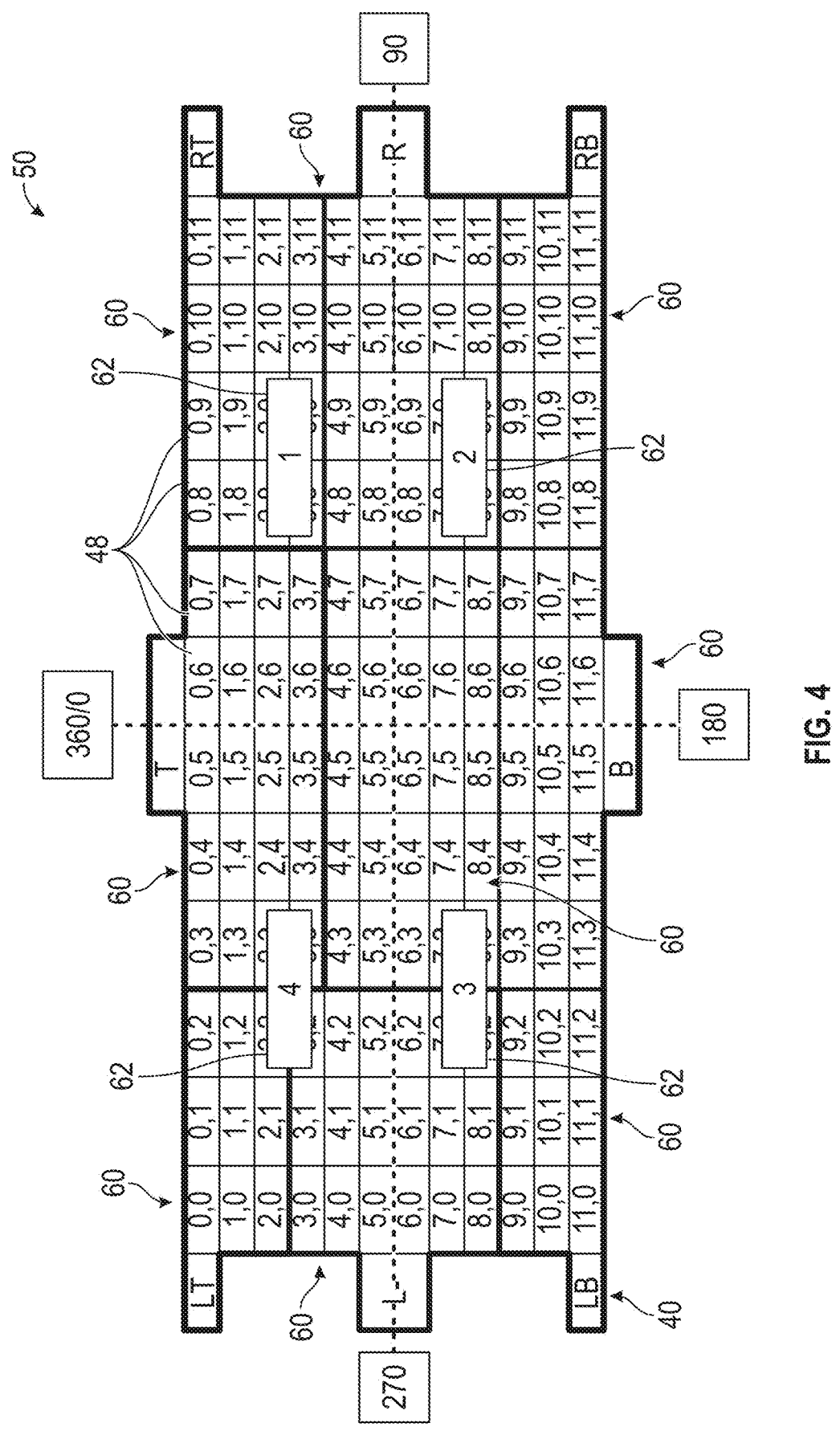
FIG. 4 illustrates the node map of the capacitive grid array where each cell is assigned to a unique region, according to an exemplary embodiment.

FIG. 4 illustrates the node map 50 of the capacitive grid array 40, where the plurality of cells 48 are assigned a unique region 60 based on their relative position within the grid pattern 52. In the exemplary embodiment as shown in FIG. 4, the plurality of cells 48 are assigned into one of nine unique regions 60 that include a left top (LT) region, a left (L) region, a left bottom (LB) region, a top (T) region, a center (C) region, a bottom (B) region, a right top (RT) region, a right (R) region, and a right bottom (RB) region. FIG. 4 also illustrates the plurality of cells 48 being assigned to a unique section 62 as well. In the embodiment as shown in FIG. 4, the capacitive grid array 40 is divided into four sections 1, 2, 3, 4, that are marked with a dashed line, where section 1 is located in a top right quadrant, section 2 is located in a bottom right quadrant, section 3 is located in a bottom left quadrant, and section 4 is located in a top left quadrant.

Figure 5:
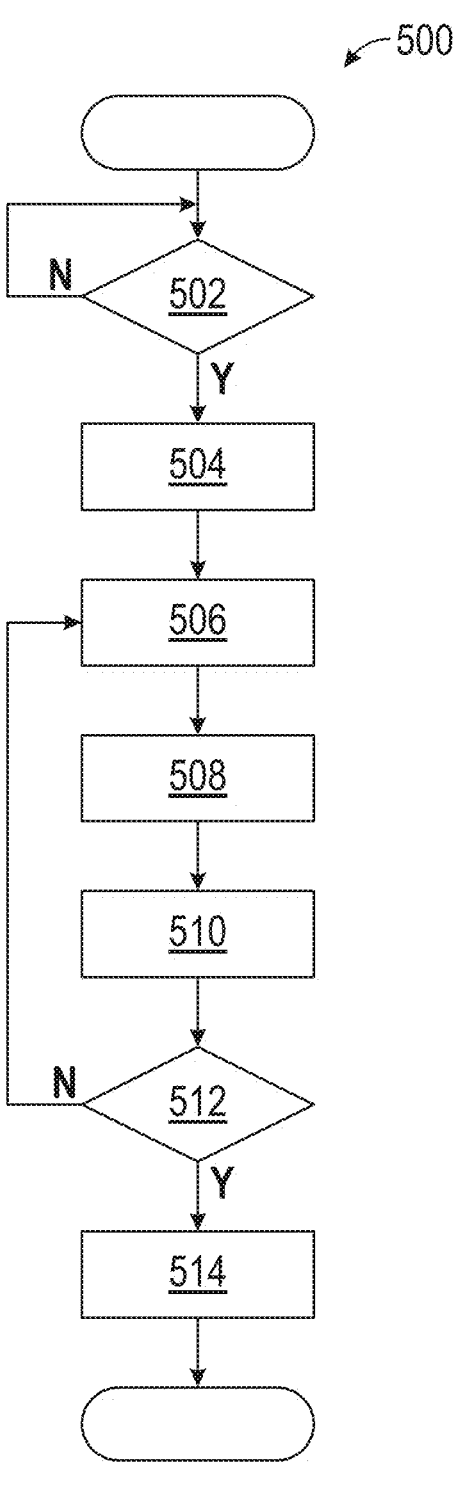
FIG. 5 is a process flow diagram illustrating an exemplary method for calculating a touch intent vector, according to an exemplary embodiment.

Referring to FIGS. 1, 2, and 3, the one or more controllers 20 of the predictive touch system 16 continue to monitor the capacitive grid array 40 for a first change in the capacitance levels. The first change in capacitance levels indicates a hover interaction between the finger of either the leftward oriented user 22 or the rightward oriented user 24 and the outer surface 30 of the front lens 32 of the display 26 of the dual touchscreen 14. In response to detecting a first change in capacitance levels that indicates a hover interaction, the one or more controllers 20 initiate calculating a touch intent vector. The touch intent vector represents a slope and a direction travel of a finger of a user (e.g., either the leftward oriented user 22 or the rightward oriented user 24) as the finger hovers over the outer surface 30 of the display 26. FIG. 5 is a process flow diagram illustrating a method 500 for calculating the touch intent vector, which is described in detail below. The touch intent vector includes an origin point that indicates the unique two-dimensional Cartesian coordinate representing a unique cell 48 of the capacitive grid array 40 (FIG. 3) of the display 26 of the dual touchscreen 14. The origin point of the touch intent vector represents an individual cell 48 of the capacitive grid array 40 where the finger first initiated the hover interaction.

Figure 6:
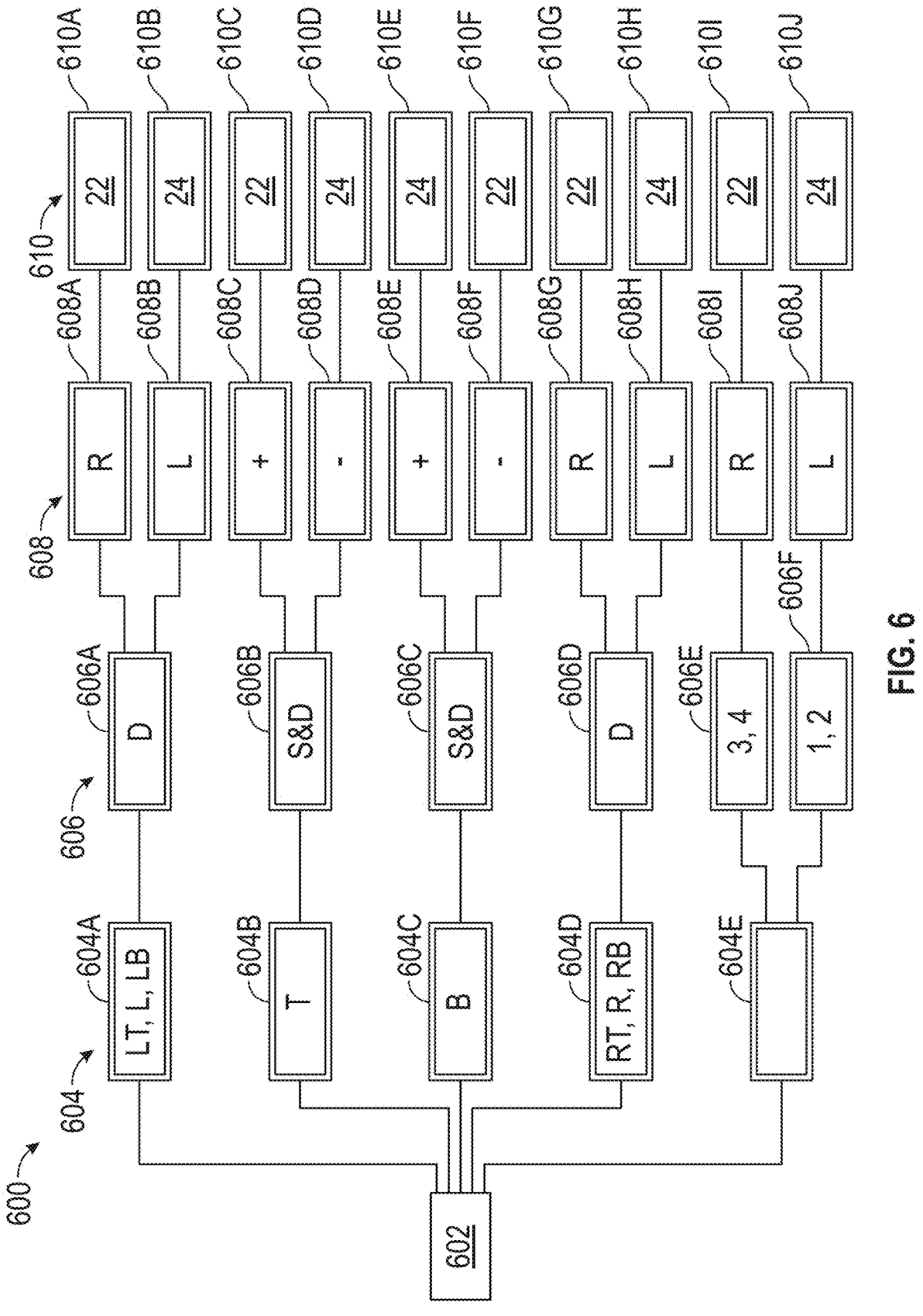
FIG. 6 illustrates a decision tree saved in memory of the one or more controllers, according to an exemplary embodiment.

The one or more controllers 20 continue to update the slope and the direction of travel of the finger of the touch intent vector until detecting a second change in capacitance levels of the capacitive grid array 40. The second change in capacitance is indicative of the finger of the user contacting the outer surface 30 of the display 26. In response to detecting the second change in capacitance levels of the capacitive grid array 40, the one or more controllers 20 cease updating the slope and direction of travel of the finger of the touch intent vector, and the one or more controllers 20 then determines the source of the touch interaction between the display 26 of the dual touchscreen 14 based on the origin point of the touch intent vector, the slope of the touch intent vector, and the direction of travel of the finger creating the touch intent vector. FIG. 6 illustrates a decision tree 600 that may be used to determine the source of the touch interaction and is described in detail below.

Referring generally to FIGS. 1, 2, 4, and 5, a method 500 for calculating the touch intent vector is described. The method 500 may begin at decision block 502. In decision block 502, the one or more controllers 20 continue to monitor the capacitive grid array 40 for the first change in the capacitance levels that indicate a hover interaction. In response to detecting the first change in capacitance levels that indicates a hover interaction, the one or more controllers 20 set a time value t to t=0, and the method 500 may then proceed to block 504.

In block 504, the one or more controllers 20 divide the capacitance levels generated by the capacitive grid array 40 into two or more capacitance gradient levels. Referring specifically to FIG. 3, it is to be appreciated that the hover interaction creates a change in the capacitance levels of multiple cells 48 that are part of the capacitive grid array 40 of the of the dual touchscreen 14. It is to be appreciated that each cell 48 of the capacitive grid array 40 may generate a unique capacitance level in response to the hover interaction. The unique capacitance levels generated by the cells 48 are divided into the two or more capacitance gradient levels. In one non-limiting embodiment, the one or more controllers 20 divide the capacitance levels of the capacitive grid array 40 into five gradient levels. The method 500 may then proceed to block 506.

In block 506, the one or more controllers 20 identify an individual cell 48 of the capacitive grid array 40 having the maximum capacitance level of the two or more capacitance gradient levels. The method 500 may then proceed to block 508.

In block 508, the one or more controllers 20 determine the unique two-dimensional Cartesian coordinates assigned to the individual cell 48 of the capacitive grid array 40 having the maximum capacitance level of the two or more capacitance gradient levels. As mentioned above and seen in FIG. 3, the unique two-dimensional Cartesian coordinates for a particular cell 48 are determined based on the node 54 created by the intersection between the vertically oriented capacitive trace 42 and the horizontally oriented capacitive trace 44. It is to be appreciated that the unique two-dimensional Cartesian coordinates assigned to the individual cell 48 of the capacitive grid array 40 represents the origin point of the touch intent vector. The method 500 may then proceed to block 510.

In block 510, the one or more controllers 20 calculate intermediate values for the slope and the direction of travel of the finger of the touch intent vector for all time values t up until the current point in time. It is to be appreciated that in block 510, the finger of the user 22, 24 is moving but is not contacting the outer surface 30 of the display 26. The method 500 may then proceed to decision block 512.

In decision block 512, the method 500 may return to block 506 until the one or more controllers 20 detect the second change in capacitance levels of the capacitive grid array 40. In response to detecting the second change in capacitance levels of the capacitive grid array 40, the method 500 may proceed to block 514.

In block 514, the one or more controllers 20 set the time value t to $t_{final}$, determine the finger of the user 22, 24 is contacting the outer surface 30 of the display 26, and determine the slope and the direction of travel of the finger of the touch intent vector based on all time values t from t=0 to $t=t_{final}$.

In one embodiment, the slope of the touch intent vector is determined based on Equation 1, which is:

$$\text{Slope} = \frac{\sum (x_t - \bar{x})(y_t - \bar{y})}{\sum (x_t - \bar{x})^2}$$

where $x_t$, $y_t$ represent current values for the unique two-dimensional Cartesian coordinates assigned to the individual cell 48 of the capacitive grid array 40 and $\bar{x}, \bar{y}$ represent the previous values for the unique two-dimensional Cartesian coordinates assigned to the individual cell 48 of the capacitive grid array 40 that are determined immediately before the current values $x_t$, $y_t$. The method 500 may then terminate.

FIG. 6 illustrates the decision tree 600 stored in memory of the one or more controllers 20 (FIG. 1). The decision tree 600 includes a flow diagram for determining the source of the touch interaction based on the origin point of the touch intent vector, the slope of the touch intent vector, and the direction of travel of the finger creating the touch intent vector. The decision tree 600 includes a root node 602 that first determines the origin point of the touch intent vector, a plurality of first level decision nodes 604 that are based on the unique region 60 within the grid pattern 52 (FIG. 4), a plurality of second level decision nodes 606, a plurality of third level decision nodes 608, and a plurality of leaf nodes 610 that each indicate the source of the touch interaction as either the leftward oriented user 22 or the rightward oriented user 24 (FIG. 1).

Referring to both FIGS. 4 and 6, the root node 602 of the decision tree 600 assigns the origin point of the touch intent vector to one of the first level decision nodes 604A-604E based on the unique region 60 where the origin point is located within the capacitive grid array 40. As mentioned above, each cell 48 of the capacitive grid array 40 is assigned to one of the unique regions 60 based on their relative position relative to one another within the grid pattern 52. In the embodiment as shown, the first level decision node 604A indicates the origin point of the touch intent vector is located within the left top (LT) region, the left (L) region, or the left bottom (LB) region. The first level decision node 604B indicates the origin point of the touch intent vector is located within the top (T) region. The first level decision node 604C indicates the origin point of the touch intent vector is located within the bottom (B) region. The first level decision node 604D indicates the origin point of the touch intent vector is located within the right top (RT) region, the right (R) region, or the right bottom (RB) region. Finally, the first level decision node 60E indicates that a single cell 48 of the capacitive grid array 40 is selected.

FIG. 6 illustrates six second level decision nodes 606A-606F. The second level decision node 606A is assigned from the first level decision node 604A and refers to the direction of travel (D) of the user's finger. The second level decision node 606B is assigned from the first level decision node 604B and refers to both the slope and the direction of travel of the finger (S&D) of the user's finger. The second level decision node 606C is assigned from the first level decision node 604C and refers to both the slope and the direction of travel of the finger (S&D) of the user's finger. The second level decision node 606D is assigned from the first level decision node 604D and refers to the direction of travel of the finger (D) of the user's finger. The second level decision nodes 606E and 606F are both assigned from the first level decision node 604E, where the second level decision node 606E is selected when the single cell 48 falls within sections 3 or 4 of the capacitive grid array 40 (FIG. 4), and the second level decision node 606F is selected with the single cell 48 falls within sections 1 or 2 of the capacitive grid array 40.

FIG. 6 illustrates ten third level decision nodes 608A-608J. The third level decision nodes 608A and 608B are assigned from the second level decision node 606A, where the third level decision node 608A indicates the finger is traveling in the right direction (R) and the third level decision node 608B indicates the finger is traveling in the left direction (L). The third level decision nodes 608C and 608D are assigned from the second level decision node 606B, where the third level decision node 608C indicates a positive slope (+) and the third level decision node 608D indicates a negative slope (−). The third level decision nodes 608E and 608F are assigned from the second level decision node 606C, where the third level decision node 608E indicates a positive slope (+) and the third level decision node 608F indicates a negative slope (−). The third level decision nodes 608G and 608H are assigned from the second level decision node 606D, where the third level decision node 608G indicates the finger is moving to the right and the third level decision node 608H indicates the finger is moving to the left. The third level decision node 608I is assigned from the second level decision node 606E and indicates the finger is moving to the right, and the third level decision node 608J is assigned from the second level decision node 606F and indicates the finger is moving to the left.

Referring to both FIGS. 1 and 6, the decision tree 600 includes ten leaf nodes 610A-610J that each indicate the source of the touch interaction as either the leftward oriented user 22 or the rightward oriented user 24. As seen in FIG. 6, each leaf node 610A-610J is assigned from a single one of the third level decision nodes 608.

Referring generally to the figures, the disclosed predictive touch system provides various technical effects and benefits. Specifically, the predictive touch system determines the source of a touch interaction with a dual touchscreen based on changes in capacitance between adjacent cells that are part of the capacitive grid array that is part the dual touchscreen. Thus, the disclosed predictive touch system obviates the need for external sensors such as an in-cabin vehicular camera to determine the source of the touch interaction between the touchscreen and a user.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A predictive touch system for determining a source of a touch interaction between a dual touchscreen and either a leftward oriented user or a rightward oriented user, the predictive touch system comprising:

one or more controllers in electronic communication with the dual touchscreen, wherein the dual touchscreen includes a display and a capacitive grid array that is divided into a plurality of cells, and wherein the one or more controllers include one or more processors that execute instructions to:

monitor the capacitive grid array for a first change in capacitance levels of the capacitive grid array;

in response to detecting a first change in capacitance levels of the capacitive grid array, initiate calculating a touch intent vector that represents an origin point, a slope, and a direction travel of a finger of either the leftward oriented user or the rightward oriented user;

continue updating the slope and the direction of travel of the finger of the touch intent vector until detecting a second change in capacitance levels of the capacitive grid array;

in response to detecting the second change in capacitance levels of the capacitive grid array, cease updating the slope and direction of travel of the finger of the touch intent vector and determine the source of the touch interaction between the display of the dual touchscreen based on the origin point of the touch intent vector, the slope of the touch intent vector, and the direction of travel of the finger, wherein a decision tree including a flow diagram for determining the source of the touch interaction based on the origin point of the touch intent vector, the slope of the touch intent vector, and the direction of travel of the finger creating the touch intent vector is stored in memory of the one or more controllers, and wherein a root node of the decision tree assigns the origin point of the touch intent vector to one of a plurality of first level decision nodes based on a unique region where the origin point is located within the capacitive grid array of the dual touchscreen, and each cell of the capacitive grid array is assigned to one of the unique regions based on their relative position to one another, and wherein the unique region is one of the following regions: a left top region, a left region, a left bottom region, a top region, a center region, a bottom region, a right top region, a right region, and a right bottom region; and in response to determining the source of the touch interaction, instruct the dual touchscreen to generate unique graphic content specifically directed to either the leftward oriented user or the rightward oriented user upon the display.

2. The predictive touch system of claim 1, wherein calculating the touch intent vector is determined by:

in response to detecting the first change in capacitance levels of the capacitive grid array, dividing the capacitance levels of the capacitive grid array into two or more capacitance gradient levels; and identifying an individual cell of the capacitive grid array having the maximum capacitance level of the two or more capacitance gradient levels.

3. The predictive touch system of claim 2, wherein calculating the touch intent vector is determined by:

determining unique two-dimensional Cartesian coordinates assigned to the individual cell of the capacitive grid array having a maximum capacitance level of the two or more capacitance gradient levels.

4. The predictive touch system of claim 3, wherein the unique two-dimensional Cartesian coordinates assigned to the individual cell of the capacitive grid array represents the origin point of the touch intent vector.

5. The predictive touch system of claim 3, wherein calculating the touch intent vector is determined by:

calculating intermediate values for the slope and the direction of travel of the finger of the touch intent vector for all time values up until a current point in time.

6. The predictive touch system of claim 5, wherein calculating the touch intent vector is determined by:

in response to detecting the second change in capacitance levels of the capacitive grid array, determine the finger is contacting an outer surface of the display and determine the slope and the direction of travel of the finger of the touch intent vector.

7. The predictive touch system of claim 1, wherein the first change in capacitance indicates a hover interaction between the finger of either the leftward oriented user or the rightward oriented user and an outer surface of a front lens of the display of the dual touchscreen.

8. The predictive touch system of claim 1, wherein the second change in capacitance is indicative of the finger of either the leftward oriented user or the rightward oriented user contacting an outer surface of the display.

9. The predictive touch system of claim 1, wherein the leftward oriented user is a driver of a vehicle and the rightward oriented user is a front passenger of the vehicle.

10. The predictive touch system of claim 9, wherein the one or more controllers instruct one or more systems that are part of the vehicle to disregard input to the dual touchscreen generated by the source of the touch interaction.

11. The predictive touch system of claim 1, wherein the the capacitive grid array is further divided into four individual sections that include section one located in a top right quadrant, section two located in a bottom right quadrant, section three located in a bottom left quadrant, and section four located in a top left quadrant.

12. The predictive touch system of claim 11, wherein a single first level decision node is indicative of a single cell of the capacitive grid array being selected and two unique second level decision nodes depend upon the single first level decision node, and wherein two unique third level decision nodes each depend upon one of the two unique second level decision nodes and indicate the finger is moving to either the left or the right.

13. The predictive touch system of claim 12, wherein the one or more controllers execute instructions to:

in response to determining the single cell falls within either section three or section four of the capacitive grid array, select one of the two unique second level decision nodes; and in response to determining the single cell falls within either section one or section two of the capacitive grid array, select a remining one of the two unique second level decision nodes, wherein the two unique second level decision nodes.

14. A method for determining a source of a touch interaction between a dual touchscreen and either a leftward oriented user or a rightward oriented user by a predictive touch system, the method comprising:

monitoring, by one or more controllers, a capacitive grid array of the dual touchscreen for a first change in capacitance levels of the capacitive grid array, wherein the one or more controllers are in electronic communication with the dual touchscreen, the dual touchscreen includes a display, and the capacitive grid array is divided into a plurality of cells;

in response to detecting a first change in capacitance levels of the capacitive grid array, initiate calculating a touch intent vector that represents an origin point, a slope, and a direction travel of a finger of either the leftward oriented user or the rightward oriented user;

continue updating the slope and the direction of travel of the finger of the touch intent vector until detecting a second change in capacitance levels of the capacitive grid array;

in response to detecting the second change in capacitance levels of the capacitive grid array, cease updating the slope and direction of travel of the finger of the touch intent vector and determine the source of the touch interaction between the display of the dual touchscreen based on the origin point of the touch intent vector, the slope of the touch intent vector, and the direction of travel of the finger, wherein a decision tree including a flow diagram for determining the source of the touch interaction based on the origin point of the touch intent vector, the slope of the touch intent vector, and the direction of travel of the finger creating the touch intent vector is stored in memory of the one or more controllers, and wherein a root node of the decision tree assigns the origin point of the touch intent vector to one of a plurality of first level decision nodes based on a unique region where the origin point is located within the capacitive grid array of the dual touchscreen, and each cell of the capacitive grid array is assigned to one of the unique regions based on their relative position to one another, and wherein the unique region is one of the following regions: a left top region, a left region, a left bottom region, a top region, a center region, a bottom region, a right top region, a right region, and a right bottom region; and in response to determining the source of the touch interaction, instructing the dual touchscreen to generate unique graphic content specifically directed to either the leftward oriented user or the rightward oriented user upon the display.

15. A predictive touch system for determining a source of a touch interaction between a dual touchscreen and either a driver or a passenger of a vehicle, the predictive touch system comprising:

one or more controllers in electronic communication with the dual touchscreen, wherein the dual touchscreen includes a display and a capacitive grid array that is divided into a plurality of cells, and wherein the one or more controllers include one or more processors that execute instructions to:

monitor the capacitive grid array for a first change in capacitance levels of the capacitive grid array;

in response to detecting a first change in capacitance levels of the capacitive grid array, initiate calculating a touch intent vector that represents an origin point, a slope, and a direction travel of a finger of either the driver of the passenger of the vehicle;

continue updating the slope and the direction of travel of the finger of the touch intent vector until detecting a second change in capacitance levels of the capacitive grid array;

in response to detecting the second change in capacitance levels of the capacitive grid array, cease updating the slope and direction of travel of the finger of the touch intent vector and determine the source of the touch interaction between the display of the dual touchscreen based on the origin point of the touch intent vector, the slope of the touch intent vector, and the direction of travel of the finger, wherein a decision tree including a flow diagram for determining the source of the touch interaction based on the origin point of the touch intent vector, the slope of the touch intent vector, and the direction of travel of the finger creating the touch intent vector is stored in memory of the one or more controllers, and wherein a root node of the decision tree assigns the origin point of the touch intent vector to one of a plurality of first level decision nodes based on a unique region where the origin point is located within the capacitive grid array of the dual touchscreen, and each cell of the capacitive grid array is assigned to one of the unique regions based on their relative position to one another, and wherein the unique region is one of the following regions: a left top region, a left region, a left bottom region, a top region, a center region, a bottom region, a right top region, a right region, and a right bottom region; and in response to determining the source of the touch interaction, instruct the dual touchscreen to generate unique graphic content specifically directed to either the driver or the passenger upon the display, and instruct one or more systems that are part of the vehicle to disregard input to the dual touchscreen generated by the source of the touch interaction.

16. The predictive touch system of claim 15, wherein calculating the touch intent vector is determined by:

in response to detecting the first change in capacitance levels of the capacitive grid array, dividing the capacitance levels of the capacitive grid array into two or more capacitance gradient levels; and identifying an individual cell of the capacitive grid array having the maximum capacitance level of the two or more capacitance gradient levels.

17. The predictive touch system of claim 16, wherein calculating the touch intent vector is determined by:

determining unique two-dimensional Cartesian coordinates assigned to the individual cell of the capacitive grid array having a maximum capacitance level of the two or more capacitance gradient levels.

18. The predictive touch system of claim 17, wherein the unique two-dimensional Cartesian coordinates assigned to the individual cell of the capacitive grid array represents the origin point of the touch intent vector.

19. The predictive touch system of claim 17, wherein calculating the touch intent vector is determined by:

calculating intermediate values for the slope and the direction of travel of the finger of the touch intent vector for all time values up until a current point in time.

20. The predictive touch system of claim 19, wherein calculating the touch intent vector is determined by:

in response to detecting the second change in capacitance levels of the capacitive grid array, determine the finger is contacting an outer surface of the display and determine the slope and the direction of travel of the finger of the touch intent vector.

* * * * *